US011440735B2

(12) United States Patent
Messick, Jr.

(10) Patent No.: US 11,440,735 B2
(45) Date of Patent: Sep. 13, 2022

(54) FLATWIRE BELT CONVEYOR SYSTEMS AND METHODS

(71) Applicant: Cambridge International, Inc., Cambridge, MD (US)

(72) Inventor: George H. Messick, Jr., Cambridge, MD (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 17/039,448

(22) Filed: Sep. 30, 2020

(65) Prior Publication Data

US 2021/0101750 A1   Apr. 8, 2021

Related U.S. Application Data

(60) Provisional application No. 62/910,614, filed on Oct. 4, 2019.

(51) Int. Cl.
*B65G 15/54* (2006.01)
*B65G 15/48* (2006.01)

(52) U.S. Cl.
CPC ............. *B65G 15/54* (2013.01); *B65G 15/48* (2013.01)

(58) Field of Classification Search
None
See application file for complete search history.

(56) References Cited

U.S. PATENT DOCUMENTS

| 1,756,598 | A | * | 4/1930 | King | B65G 15/54 |
| | | | | | 198/683 |
| 2,255,364 | A | | 9/1941 | Pink | |
| 3,041,708 | A | | 7/1962 | Holtz | |
| 3,055,488 | A | * | 9/1962 | Stone | B65G 15/48 |
| | | | | | 198/699.1 |
| 3,580,388 | A | | 5/1971 | Resener | |
| 3,633,737 | A | | 1/1972 | Magaldi | |
| 4,629,063 | A | | 12/1986 | Hodlewsky et al. | |

(Continued)

FOREIGN PATENT DOCUMENTS

| FR | 2611678 A1 | 9/1988 |
| FR | 2815330 A1 | 4/2002 |

(Continued)

OTHER PUBLICATIONS

Wire Belt Company Limited, Specialty Conveyor Belts, http://www.wirebelt.com/products/products-belts/specialty-belts, Copyright 2017, 5 pages.

*Primary Examiner* — Kavel Singh
(74) *Attorney, Agent, or Firm* — Quarles & Brady LLP (57) ABSTRACT

A flatwire conveyor belt system that can include a flatwire belt with a plurality of flatwire pickets wherein each individual flatwire picket has a plurality of longitudinal members and a first plurality of lateral members extending between and connecting the plurality of longitudinal members. Each of the first plurality of lateral members can have a first lateral member length, and the plurality of longitudinal members and the first plurality of lateral members can define a first flatwire belt portion. A flight with a set of tabs defining a tab distance can be affixed to the flatwire belt, and the tab distance can be substantially similar to the sum of the lateral member lengths of at least a portion of the first plurality of lateral members.

14 Claims, 5 Drawing Sheets

(56) References Cited

U.S. PATENT DOCUMENTS

| | | | |
|---|---|---|---|
| 4,698,504 A * | 10/1987 | Van Pelt | B41F 22/00 250/319 |
| 4,972,942 A | 11/1990 | Faulkner | |
| 5,156,264 A | 10/1992 | Lapeyre | |
| 5,645,160 A | 7/1997 | Palmaer et al. | |
| 5,957,268 A | 9/1999 | Meulenkamp | |
| 5,996,776 A | 12/1999 | van Zijderveld | |
| 6,471,041 B1 | 10/2002 | Long et al. | |
| 6,499,587 B1 | 12/2002 | Greve | |
| 6,763,936 B2 | 7/2004 | Marsetti et al. | |
| 6,814,223 B1 | 11/2004 | Verdigets et al. | |
| 7,108,127 B2 | 9/2006 | Krisl | |
| 7,255,227 B2 | 8/2007 | Melancon | |
| 7,658,277 B2 | 2/2010 | Meulenkamp | |
| 7,987,972 B2 | 8/2011 | Hennigar et al. | |
| 8,636,141 B2 | 1/2014 | Neely et al. | |
| 8,757,366 B2 | 6/2014 | MacLachlan | |
| 9,206,826 B2 | 12/2015 | Bindig et al. | |
| 9,212,003 B2 | 12/2015 | Gabler | |
| 9,555,970 B2 | 1/2017 | Franzoni et al. | |
| 9,694,979 B2 | 7/2017 | Ulchak et al. | |
| 9,994,396 B1 | 6/2018 | Maine, Jr. et al. | |
| 10,689,199 B2 * | 6/2020 | Lago | B65G 17/42 |
| 2006/0163039 A1 | 7/2006 | Marshall et al. | |
| 2008/0142342 A1 | 6/2008 | Stebnicki et al. | |
| 2008/0164128 A1 | 7/2008 | Ririe | |
| 2013/0140151 A1 | 6/2013 | Neely et al. | |
| 2014/0027251 A1 | 1/2014 | Cornelissen et al. | |
| 2017/0129708 A1 | 5/2017 | Maine, Jr. et al. | |
| 2020/0262654 A1 * | 8/2020 | Baxter | B65G 15/54 |

FOREIGN PATENT DOCUMENTS

| | | |
|---|---|---|
| NL | 1005979 C2 | 11/1998 |
| WO | 2010021116 A1 | 2/2010 |

* cited by examiner

FLATWIRE BELT CONVEYOR SYSTEMS AND METHODS

CROSS-REFERENCE TO RELATED APPLICATION

This application claims priority under 35 U.S.C. § 119 to U.S. Provisional Patent Application No. 62/910,614 filed on Oct. 4, 2019, the entire contents of which are incorporated herein by reference.

STATEMENT CONCERNING FEDERALLY SPONSORED RESEARCH AND DEVELOPMENT

Not applicable.

TECHNICAL FIELD

The present disclosure is described in the context of metal flatwire conveyor belt arrangements. More specifically, the present disclosure relates to flatwire conveyor belt arrangements capable of use in conveying applications incorporating a flight engaged with a cross-rod of a conveyor belt.

BACKGROUND

Metal flatwire belts comprised of flatwire pickets of various widths and opening sizes have been used in many different process-conveying applications, including, for instance, product freezing, frying, washing, chilling, and heat treatment. Frequently, metal flatwire belts are used in incline/decline conveying applications or applications where the product needs to be confined within the length of the belt. For these applications, flights (a.k.a. "pushers") may also be incorporated. Improvements in flatwire belt forming technology have provided significant customization of the flatwire belt form factor to accommodate the unique requirements of any particular application (e.g., the flatwire pattern and/or overall dimensions best suited to accommodate the desired structural integrity for the conveyed product). As a result, it can be difficult to incorporate and attach flights to the metal flatwire belt in a way that is both practical and effective. The flights can be welded directly to the flatwire at certain locations, but this can compromise the flatwire itself and the welds can become prone to degradation during service due to loading and fatigue. Alternatively, flights can be bolted to the flatwire using common hardware or a combination of specially made clamping components along with common hardware (see, e.g., FIG. 1). The hardware is usually positioned to bridge a cross-rod and then secured to the flight to provide further stability to the overall assembly. Although this method of assembly is effective, it is somewhat costly from a manufacturing standpoint and can severely compromise the belt from an overall cleanliness and sanitation standpoint.

Therefore, a need exists for an improved flatwire conveyor belt system with flights that maintain the conventional features and benefits, while addressing various deficiencies associated with the assembly and implementation of flights on flatwire conveyor belt assemblies.

SUMMARY

A system is provided in which the openings across the width of the belt, through at least one of pattern and width of the pickets used, allows a customized belt to be provided for a particular application that may use the belt material more optimally in consideration of application-specific requirements, provide dedicated points of sprocket engagement, and/or resist both belt fatigue and elongation failures. Because the width of the flights are generally application-specific, the customizable belt allows for any predetermined width of flight to nest properly in the belt and be retained by the same cross-rods that join the pickets, reducing manufacturing costs and increasing the ease of assembly.

Some embodiments provide a flatwire conveyor belt system that can include a flatwire belt with a plurality of flatwire pickets wherein each individual flatwire picket has a plurality of longitudinal members and a first plurality of lateral members extending between and connecting the plurality of longitudinal members. Each of the first plurality of lateral members can have a first lateral member length, and the plurality of longitudinal members and the first plurality of lateral members define a first flatwire belt portion. A flight with a set of tabs defining a tab distance can be affixed to the flatwire belt, and the tab distance can be substantially similar to the sum of the first lateral member lengths of at least a portion of the first plurality of lateral members.

Another embodiment includes a flight for use in a flatwire conveyor belt system with a plurality of flatwire pickets. Each individual flatwire picket can have a first flatwire belt portion with a first plurality of lateral members with a first lateral member length. The flight can include a first bracket proximate one end portion of the flight with a first tab depending therefrom, a second bracket proximate an opposite end portion of the flight with a second tab depending therefrom, and a tab distance defined by the distance between the first tab and the second tab. The tab distance can be substantially equal to the sum of the first lateral member lengths of at least a portion of the first plurality of lateral members.

Further embodiments provide a flatwire conveyor belt system that can include a flatwire belt and a flight. The flatwire belt can have a leading row including leading longitudinal members connected at ends by leading lateral members, each leading lateral member defining a lateral member length, and an intermediate row including intermediate longitudinal members connected at ends by intermediate lateral members, each intermediate lateral member sized to extend the lateral member length. Openings can be proximate the ends of the leading longitudinal members and the intermediate longitudinal members, the openings can be configured to receive a first cross-rod to interconnect the leading row and the intermediate row. The flight can have a body extending from a first end to a second end, a first tab extending from the body at a first tab position, the first tab defining a first tab opening, and a second tab extending from the body at a second tab position spaced apart from the first tab a tab distance, the second tab defining a second tab opening. The first tab can be nested between a first one of the leading longitudinal members and a first one of the intermediate longitudinal members, and the second tab can be nested between a second one of the leading longitudinal members and a second one of the intermediate longitudinal members. The first tab opening and the second tab opening can receive the first cross-rod to couple the flight adjacent to the flatwire belt. The tab distance can be approximately a whole number multiple of the lateral member length.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having," and variations thereof herein, is meant to encompass the items listed thereafter and equivalents thereof, as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art, and the underlying principles herein can be applied to other embodiments and applications without departing from embodiments of the invention. Thus, embodiments of the invention are not intended to be limited to embodiments shown, but are to be accorded the widest scope consistent with the principles and features disclosed herein.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Some of the discussion below describes flights that can be attached to a metal flatwire belt with a cross-rod of the metal flatwire belt. The context and particulars of this discussion are presented as examples only. For instance, embodiments of the disclosed invention can be configured in various ways, including other shapes and arrangements of elements. Similarly, embodiments of the invention can be used with other types of conveyor belts or assemblies in addition to those expressly illustrated or described herein.

Figure 1:
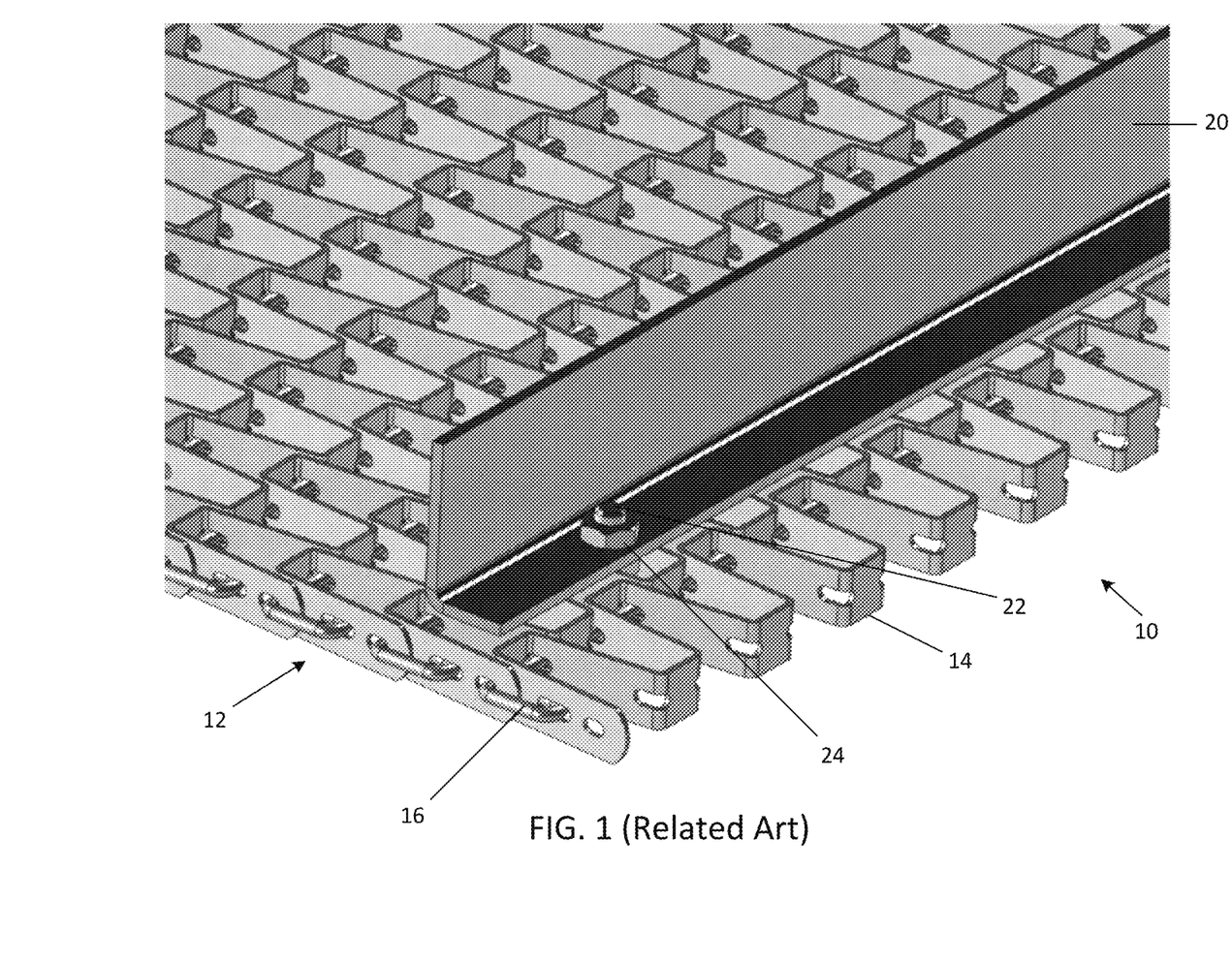
FIG. 1 is a top isometric view of related art showing a flight bolted to a metal flatwire belt.

A metal flatwire conveyor belt is typically an endless belt driven in a direction of travel. The flatwire belt can be constructed to address particular application requirements, for example, the width of flatwire pickets, of which the flatwire belt is comprised, can be changed depending on the type of item being conveyed. Moreover, the form factor of the flatwire belt can be adapted to address application-specific requirements, such as belt strength, fatigue requirements, etc. An example of a sprocket-driven flatwire conveyor belt 10 is shown in FIG. 1. The flatwire conveyor belt 10 can generally be made from a plurality of rows of contiguous pickets 14 linked by cross-rods 16 to form a flatwire belt 12, and can include an attached flight 20. The flatwire belt 12 can be driven by sprockets engaging the flatwire pickets 14 along the edges of the flatwire belt 12, for example.

The flight 20 can be bolted to the flatwire belt 12 as shown in FIG. 1. A bolt 22 (or other clamping component) is positioned to extend through the flatwire belt 12 and the flight 20, with a threaded end engaged with a nut 24. The attachment of the flight 20 is therefore provided by sandwiching the flight 20 between the nut 24 and the flatwire belt 12. As stated above, although this method of assembly is effective, it is somewhat costly from a manufacturing standpoint and can compromise the belt from an overall cleanliness and sanitation standpoint.

Figure 2:
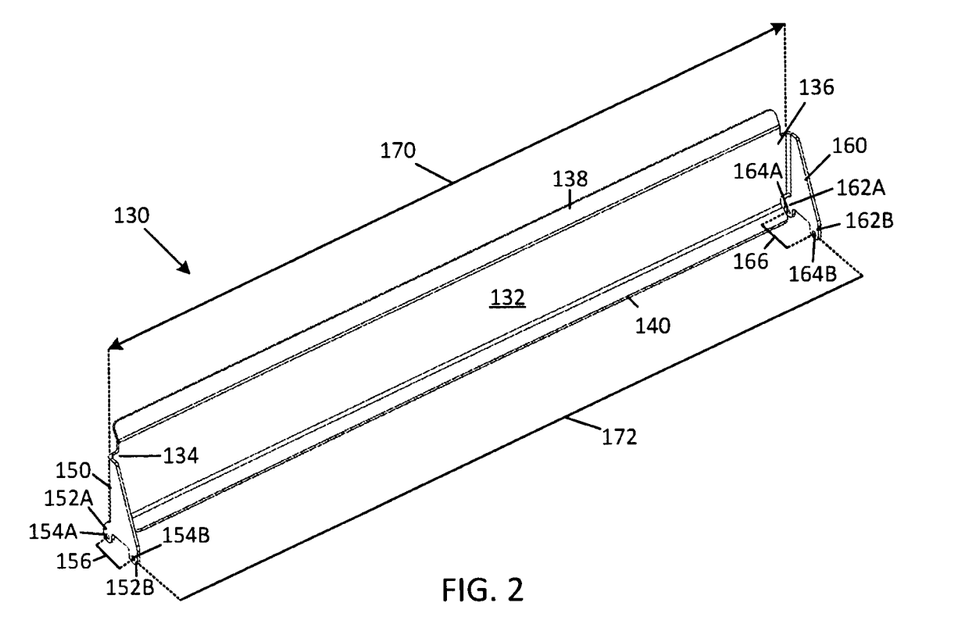
FIG. 2 is a top isometric view of an example flight in accordance with one embodiment.
Figure 3:
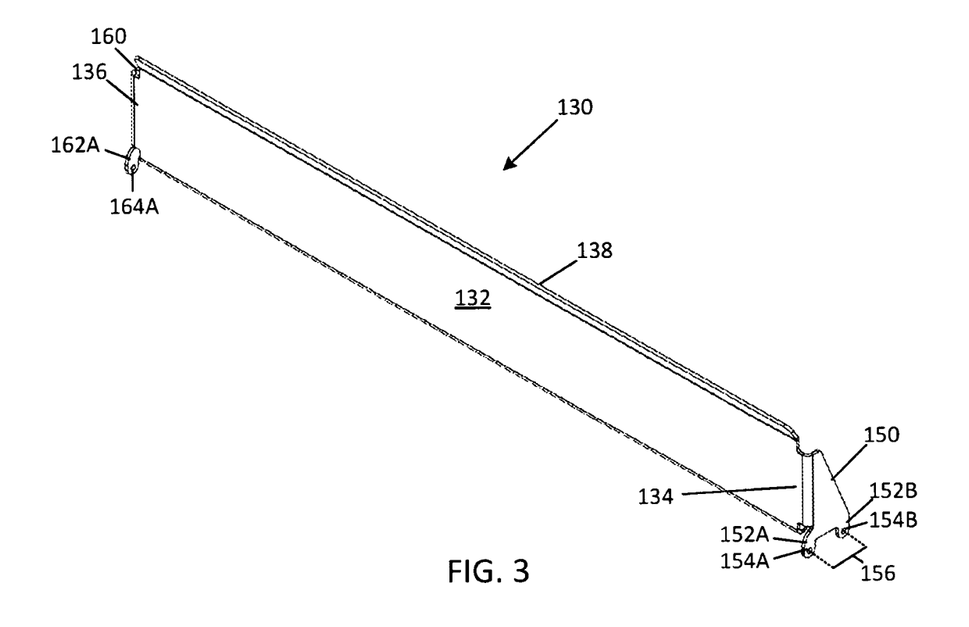
FIG. 3 is a top isometric view of the example flight of FIG. 2.

A flight 130 to be used in a flatwire conveyor belt system 100 (shown in FIGS. 4 and 5) according to one embodiment is shown in FIGS. 2 and 3. The flight 130 has an upright planar member 132, a first bracket 150, a second bracket 160, and a flight length 170. The first and second brackets 150, 160 are positioned at opposite ends 134, 136 of the upright planar member 132, and each bracket 150, 160 extends substantially perpendicular to the upright planar member 132 in substantially the same direction.

The overall flight length 170 of the example flight 130 is defined by the distance between the first and second brackets 150, 160. The flight 130 can also have additional features, such as a top member 138 and a bottom member 140 that can extend adjacent to and along the upright planar member 132 for at least a portion of the flight length 170. The top member 138 and the bottom member 140 can add additional strength and rigidity to the flight 130 and/or be adapted to engage the product being conveyed.

At least one tab extends in a downward direction from another portion of the flight 130. In the example embodiment shown in FIGS. 2, 3, and 5, each of the first and second brackets 150, 160 has two tabs extending downward therefrom. Additionally, or alternatively, tabs can extend from the bottom member 140 and be located at other positions along the flight 130. The tabs 152, 162 are designated (where visible) with "A" or "B" following the reference number 152 or 162. Unless a particular tab is specifically being described, the tabs will be discussed below using only their respective reference number 152 or 162. Similar designations will be used throughout the disclosure when referring to multiples of certain elements. A tab distance 172 is defined by the distance between the tabs 152 of the first bracket 150 and the tabs 162 of the second bracket 160. The tab distance 172 can be more, substantially similar, or less than the flight length 170.

Figure 5:
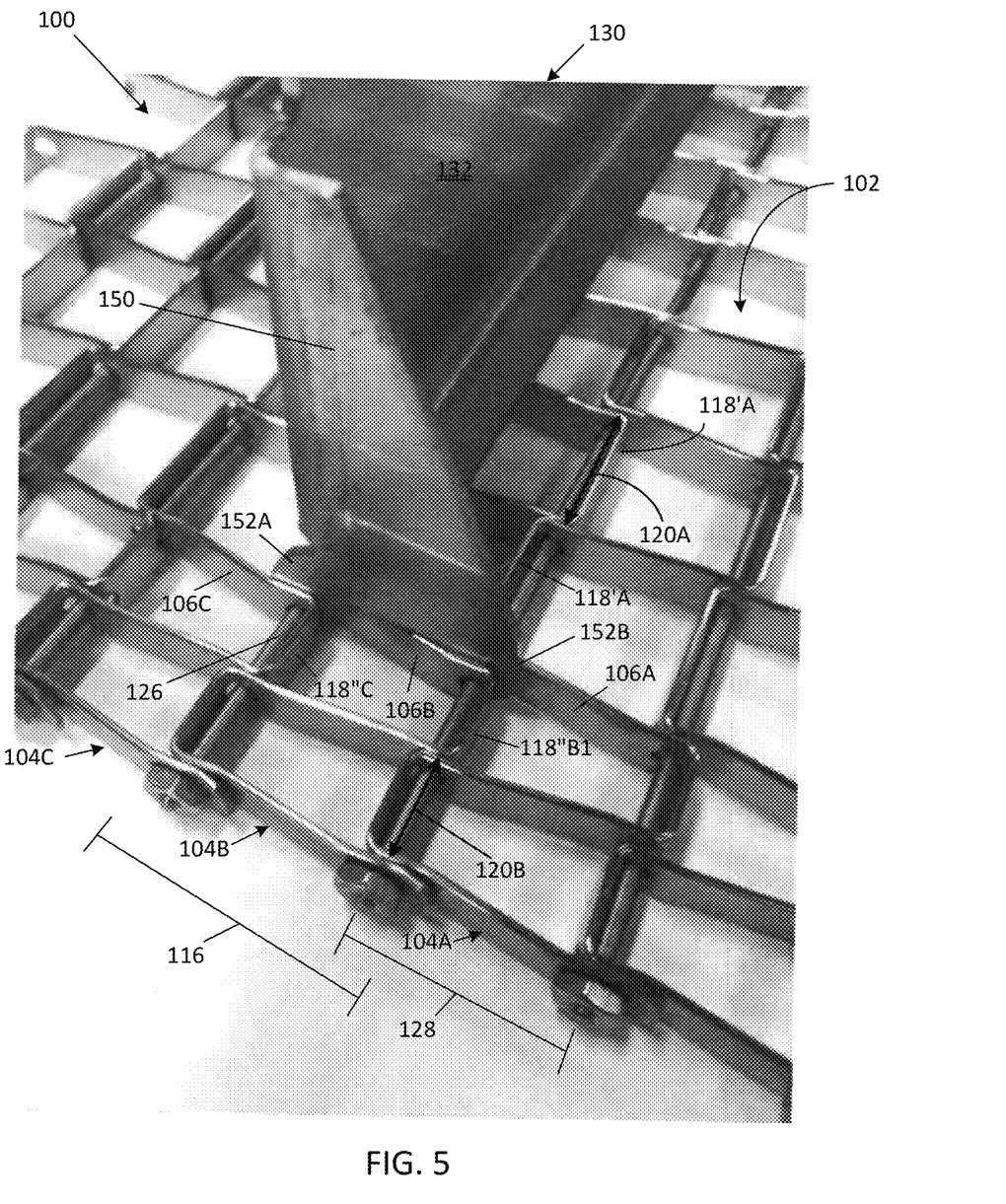
FIG. 5 is a top isometric view of the example flight of FIG. 2 installed on the example flatwire conveyor belt of FIG. 4.

Each tab 152, 162 has a hole 154, 164, respectively, configured to receive a cross-rod 126 therethrough (shown in FIG. 5). The holes 154A, 154B in the tabs 152A, 152B are spaced apart a first distance 156, and the holes 164A, 164B in the tabs 162A, 162B are spaced apart a second distance 166, wherein the first and second distances 156, 166 are substantially equal in the example embodiment.

Figure 4:
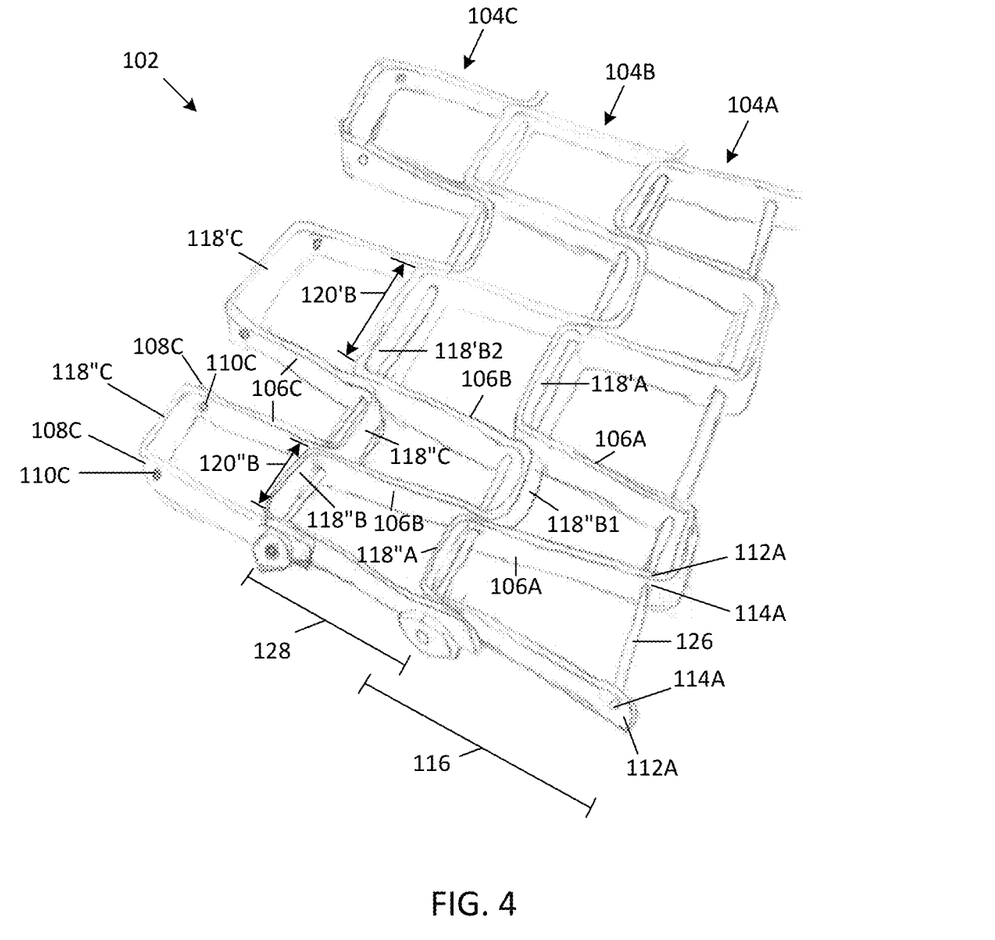
FIG. 4 is a top isometric view of an example portion of a flatwire conveyor belt.

FIG. 4 shows a portion of an example flatwire belt 102 with the flight 130 removed. The flatwire belt 102 includes a plurality of flatwire pickets 104. Each flatwire picket 104 includes a plurality of longitudinal members 106 alternatingly interconnected with a plurality of lateral members 118. The longitudinal members 106 each have a first end 108 and a second end 112. The longitudinal members 106 also have a longitudinal member length 116 and a hole 110, 114 at each of the first end 108 and the second end 112, respectively. The holes 110, 114 are configured to receive the cross-rod 126 therethrough. The distance between the holes 110, 114 on each longitudinal member 106 defines a picket pitch 128. Each of the lateral members 118 extends between and is generally nested with neighboring longitudinal members 106, alternating between joining the first ends 108 and the second ends 112.

Figure 6A:
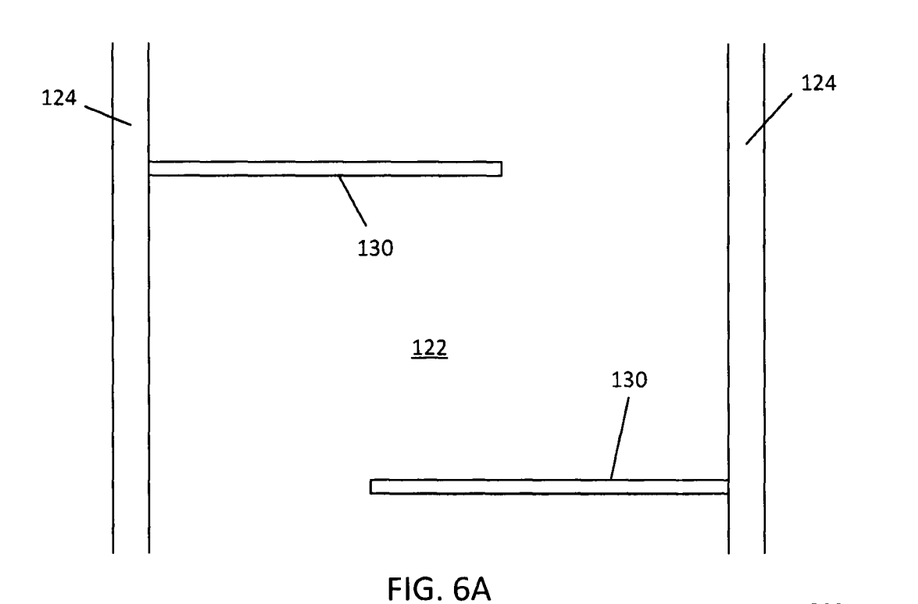
FIG. 6A is a top plan view of an example flatwire conveyor belt system arrangement in accordance with one embodiment.

The lateral members 118 can be sized to provide a flatwire conveyor belt system based on application-specific characteristics (e.g., size of conveyed objects, available space, conveyor belt drive system, etc.). As shown, there is a first plurality of lateral members 118' with a first lateral member length 120' (e.g., 120'B) and a second plurality of lateral members 118" with a second lateral member length 120" (e.g., 120"B). The first plurality of lateral members 118' and the corresponding longitudinal members 106 define a first flatwire belt portion 122 and the second plurality of lateral members 118" and corresponding longitudinal members 106 define a second flatwire belt portion 124 (shown in FIG. 6A). As shown, the first lateral member length 120' is greater than the second lateral member length 120"; however, the first lateral member length 120' can also be the same or lesser than the second lateral member length 120". It is further contemplated that the sum of the first lateral member lengths 120' of at least a portion of the first plurality of lateral members 118' is substantially equal to the tab distance 172, allowing for integration of a flight 130 as described below in more detail. It is further contemplated that the first lateral member lengths 120' of the first plurality of lateral members 118' can be the same or have different values. The second plurality of lateral members 118" is generally sized and configured to interact with a conveyor belt drive system.

The flatwire belt 102 is generally formed by receiving the lateral member 118 of one flatwire picket (e.g., flatwire picket 104A) between a pair of longitudinal members 106 of an adjacent flatwire picket (e.g., flatwire picket 104B). Cross-rods 126 are then received through the holes 110, 114 in the longitudinal members 106 to join the flatwire pickets 104A, 104B together.

FIG. 5 illustrates one embodiment of the flight 130 installed on the example flatwire belt 102. The first distance 156 between holes 154A, 154B of the first bracket 150 and the second distance 166 between holes 164A, 164B of the second bracket 160 are substantially equal to the picket pitch 128. However, the first distance 156 and/or the second distance 166 can be increased by whole-number multiples of the picket pitch 128 (if desired) to extend the location of fixation of the flight 130 across more than one flatwire picket.

The tabs 152, 162 of the flight 130 are configured to extend downwardly into the flatwire belt 102 and between longitudinal members 106 of adjacent flatwire pickets 104 at the transition between the first plurality of lateral members 118' and the second plurality of lateral members 118". The positioning between adjacent lateral members 118', 118" inhibits lateral movement of the flight 130 relative to the flatwire belt 102. As shown, the tab 152B is received between the longitudinal members 106A, 106B and adjacent to the lateral members 118'A, 118"B1 of flatwire pickets 104A, 104B, respectively, and the tab 152A is received between the longitudinal members 106B, 106C and adjacent to the lateral members 118'B2 (shown in FIG. 4), 118"C of flatwire pickets 104B, 104C, respectively. The same positioning of the tabs 162 with respect to the flatwire pickets 104A, 104B, 104C is provided on the other end 136 of the flight 130. Cross-rods 126 are then provided through holes 110, 114, 154, 164 (shown in FIGS. 2-4) to secure the flight 130 to the flatwire belt 102. Thus, the flight 130 is restrained laterally and captured to the belt 102.

Figure 6B:
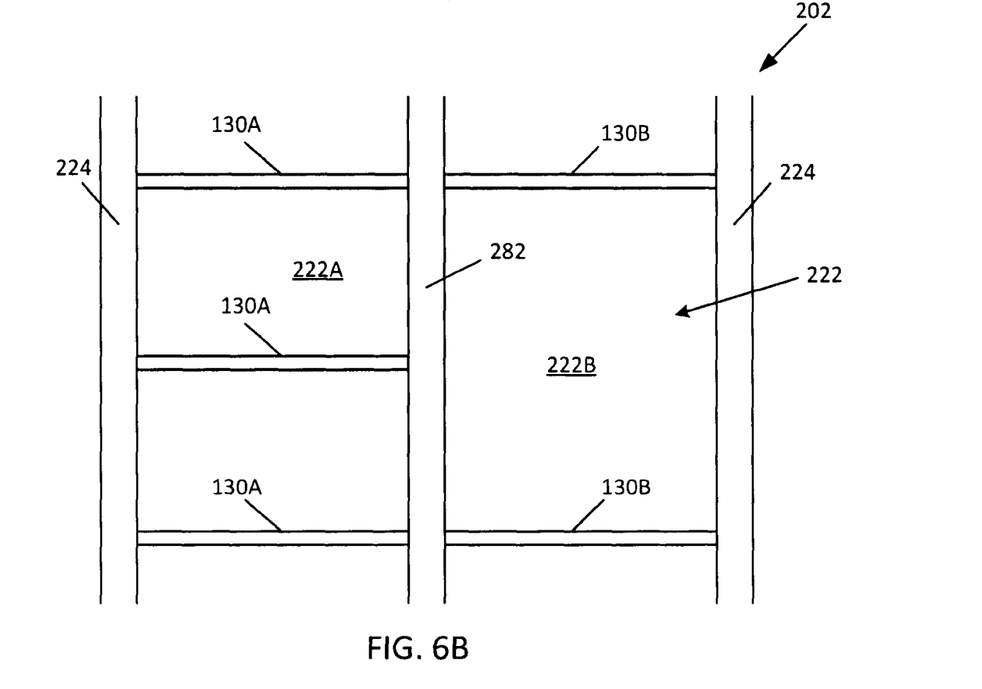
FIG. 6B is a top plan view of an example flatwire conveyor belt system arrangement in accordance with another embodiment.

The direct dimensional relationship between the tab distance 172 and the first lateral member length 120A allows for various configurations of the placement of the flights 130 on the flatwire belt 102. For example, multiple flights 130 can be staggered laterally and offset along the length of the flatwire belt 102 over at least a portion of the first flatwire belt portion 122 (shown in FIG. 6A). In some embodiments, a flatwire belt 202 may contain a third plurality of lateral members defining a third flatwire belt portion 282 in addition to a first flatwire belt portion 222 and a second flatwire belt portion 224. The third flatwire belt portion 282 divides the first flatwire belt portion 222 into two sections 222A, 222B. A set of flights 130A, 130B can then be placed side-by-side or offset from each other in respective first flatwire belt sections 222A, 222B of the divided first flatwire belt portion 222 with the third flatwire belt portion 282 therebetween (shown in FIG. 6B).

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. For example, the spacing, size, gauge, form-factor, and other features may vary based on application-specific requirements (e.g., product to be conveyed, environmental factors, speed of conveyance, operational envelope limitations, etc.). In addition, while the embodiments have been described in context of a metallic construction, it is contemplated that other materials (e.g., polymers) or composite constructions (e.g., a metallic base with a plastic overmold) are possible. A flatwire belt incorporating the attachment of a flight with integrally formed tabs during assembly establishes a flatwire conveyor with fewer individual components that is more efficiently produced, manufactured, and assembled. Other types of conveyor belts may also benefit from the incorporation of aspects of the invention. The entire disclosure of each patent and publication cited herein is incorporated by reference, as if each such patent or publication were individually incorporated by reference herein.

Various features and advantages of the invention are set forth in the following claims.

The invention claimed is:

1. A flatwire conveyor belt system comprising:
a flatwire belt with a plurality of flatwire pickets wherein each individual flatwire picket has a plurality of longitudinal members and a first plurality of lateral members extending between and connecting the plurality of longitudinal members, each of the first plurality of lateral members having a first lateral member length, the plurality of longitudinal members and the first plurality of lateral members defining a first flatwire belt portion;
a flight with a set of tabs defining a tab distance, the flight affixed to the flatwire belt;
wherein the tab distance is substantially equal to the sum of the first lateral member lengths of the first plurality of lateral members located between the set of tabs;
wherein the plurality of flatwire pickets comprises:
 a leading flatwire picket having a leading longitudinal member defining a leading inner face;
 an intermediate flatwire picket having an intermediate longitudinal member defining an intermediate outer face and an intermediate inner face opposite the intermediate outer face; and
 a trailing flatwire picket having a trailing longitudinal member defining a trailing outer face;
wherein the set of tabs comprises a leading tab and a trailing tab spaced apart;
wherein the leading tab is nested between the leading inner face and the intermediate outer face; and
wherein the trailing tab is nested between the intermediate inner face and the trailing outer face.

2. The flatwire conveyor belt system of claim 1, wherein at least some tabs of the set of tabs are positioned to nest between adjacent ones of the plurality of longitudinal members.

3. The flatwire conveyor belt system of claim 1, further comprising a cross-rod, wherein the cross-rod affixes the flight to the plurality of flatwire pickets.

4. The flatwire conveyor belt system of claim 3, wherein the flatwire belt has a second plurality of lateral members, each having a second lateral member length and defining a second flatwire belt portion, the second flatwire belt portion extending laterally along the first flatwire belt portion.

5. The flatwire conveyor belt system of claim 4, wherein at least some tabs of the set of tabs are received at the transition between the first flatwire belt portion and the second flatwire belt portion.

6. The flatwire conveyor belt system of claim 3, wherein the set of tabs has holes, wherein the holes are configured to receive the cross-rod therethrough.

7. The flatwire conveyor belt system of claim 4, further comprising a second plurality of longitudinal members, wherein the second plurality of lateral members extending between and connecting the second plurality of longitudinal members.

8. The flatwire conveyor belt system of claim 7, wherein at least some tabs of the set of tabs are positioned to nest between adjacent ones of the plurality of longitudinal members and the plurality of second longitudinal members.

9. The flatwire conveyor belt system of claim 1, wherein each of a first tab and a second tab of the set of tabs is configured to be nested between adjacent ones of the plurality of longitudinal members of adjacent flatwire pickets of the plurality of flatwire pickets.

10. A flatwire conveyor belt system comprising:
a flatwire belt comprising:
 a leading row including leading longitudinal members connected at ends by leading lateral members, each leading lateral member defining a lateral member length;
 an intermediate row including intermediate longitudinal members connected at ends by intermediate lateral members;
 a trailing row including trailing longitudinal members connected at ends by trailing lateral members; and
 openings proximate the ends of the leading longitudinal members, the intermediate longitudinal members, and the trailing longitudinal members, a first group of the openings configured to receive a first cross-rod to interconnect the leading row and the intermediate row, and a second group of the openings configured to receive a second cross-rod to interconnect the intermediate row and the trailing row;
a flight comprising:
 a body extending from a first end to a second end;
 a first tab extending from the body at a first tab position, the first tab defining a first tab opening;
 a first longitudinal tab extending from the body adjacent the first tab, the first longitudinal tab defining a first longitudinal tab opening; and
 a second tab extending from the body at a second tab position spaced apart from the first tab a tab distance, the second tab defining a second tab opening;
wherein the first tab is nested between a first one of the leading longitudinal members and a first one of the intermediate longitudinal members;
wherein the first longitudinal tab is nested between the first one of the intermediate longitudinal members and a first one of the trailing longitudinal members;
wherein the second tab is nested between a second one of the leading longitudinal members and a second one of the intermediate longitudinal members;
wherein the first tab opening and the second tab opening receive the first cross-rod to couple the flight adjacent to the flatwire belt;
the first longitudinal tab opening receives the second cross-rod to couple the flight adjacent to the flatwire belt; and
wherein the tab distance is approximately a whole number multiple of the lateral member length.

11. The flatwire conveyor belt system of claim 10, wherein:
the flight further comprising a second longitudinal tab extending from the body adjacent the second tab, the second longitudinal tab defining a second longitudinal tab opening;
the second longitudinal tab is nested between the second one of the intermediate longitudinal members and a second one of the trailing longitudinal members; and
the second longitudinal tab opening receives the second cross-rod to couple the flight adjacent to the flatwire belt.

12. The flatwire conveyor belt system of claim 10, wherein:
each intermediate lateral member is sized to extend the lateral member length; and
each trailing lateral member is sized to extend the lateral member length.

13. A flatwire conveyor belt system comprising:
a flatwire belt with a plurality of flatwire pickets wherein each individual flatwire picket has a plurality of longitudinal members and a plurality of lateral members extending between and connecting the plurality of longitudinal members;
a flight with a set of tabs comprising a leading tab and a trailing tab, the flight affixed to the flatwire belt;
wherein the plurality of flatwire pickets comprises:
 a leading flatwire picket having a leading longitudinal member defining a leading face;

an intermediate flatwire picket having an intermediate longitudinal member defining an intermediate first face and an intermediate second face; and a trailing flatwire picket having a trailing longitudinal member defining a trailing face;

wherein the leading tab is nested between the leading face and the intermediate first face; and wherein the trailing tab is nested between the intermediate second face and the trailing face.

14. The flatwire conveyor belt system of claim 13, wherein:

the set of tabs further comprises a lateral tab spaced a tab distance from the leading tab;

each of the plurality of lateral members defines a lateral member length; and the tab distance is approximately equal to the sum of the lateral member lengths of the plurality of lateral members that are positioned between the lateral tab and the leading tab.

* * * * *